United States Patent
Jin et al.

(10) Patent No.: US 6,714,554 B1
(45) Date of Patent: Mar. 30, 2004

(54) METHOD AND SYSTEM FOR SORTING PACKETS IN A NETWORK

(75) Inventors: Lei Jin, Irvine, CA (US); Shahzad Ali, Rohnert Park, CA (US); Paul Harper, Santa Rosa, CA (US)

(73) Assignee: Turin Networks, Petaluma, CA (US)

( * ) Notice: Subject to any disclaimer, the term of this patent is extended or adjusted under 35 U.S.C. 154(b) by 0 days.

(21) Appl. No.: 09/782,895

(22) Filed: Feb. 13, 2001

(51) Int. Cl.$^7$ ................................................ H04L 12/28
(52) U.S. Cl. ........................................................ 370/412
(58) Field of Search .................. 370/412, 348–354, 370/437, 461–477, 503–508, 519–523, 453–455, 392–400, 230–232, 328, 229–234, 429, 235; 709/222; 455/403

(56) References Cited

U.S. PATENT DOCUMENTS

| | | | |
|---|---|---|---|
| 5,764,626 A | | 6/1998 | Vandervort |
| 5,922,976 A | | 7/1999 | Russell et al. |
| 5,926,459 A | * | 7/1999 | Lyles et al. ................. 370/230 |
| 5,949,757 A | | 9/1999 | Katoh et al. |
| 5,953,318 A | | 9/1999 | Nattkemper et al. |
| 6,044,091 A | * | 3/2000 | Kim ............................ 370/508 |
| 6,108,305 A | * | 8/2000 | Charny et al. ............... 370/232 |
| 6,141,336 A | * | 10/2000 | Bauchot et al. ............. 370/348 |
| 6,337,851 B1 | * | 1/2002 | Charny et al. ............... 370/232 |
| 6,377,546 B1 | * | 4/2002 | Guerin et al. ............... 370/230 |

OTHER PUBLICATIONS

Nick McKeown, Martin Izzard Adisak Mekkittikul, William Ellersick, Mark Horowitz, "The Tiny Tera: A Packet Switch Core", Dept. of Electrical Enginerring & Computer Science, Stanford University, Stanford, CA 94305–4070, DSP R&D Center, Corporate Research & Development, Texas Instruments, Incorp., PO Box 655474, MS446, Dallas, TX 75265.

* cited by examiner

*Primary Examiner*—Chi Pham
*Assistant Examiner*—Prenell Jones
(74) *Attorney, Agent, or Firm*—Blakely, Sokoloff, Taylor & Zafman LLP

(57) ABSTRACT

Flows are grouped according to a first flow rate and a second flow rate. Each flow comprises of a plurality of packets. The flows in the first flow rate are sorted according to an arrival time of a first packet in each flow. These flows are placed in a first FIFO (first-in-first-out) queue with a flow having an earliest first packet arrival time located at a head of the first FIFO queue. The flows in the second flow rate are sorted according to an arrival time of a first packet in each flow. These flows are placed in a second FIFO queue with a flow having an earliest first packet arrival time located at a head of the second FIFO queue. A comparison is performed to select a packet from between the first packet of the flow at the head of the first FIFO queue with the first packet of the flow at the head of the second FIFO queue.

40 Claims, 5 Drawing Sheets

METHOD AND SYSTEM FOR SORTING PACKETS IN A NETWORK

FIELD OF THE INVENTION

The present invention relates generally to field of network communication. More specifically, the present invention is directed to a method and a system for sorting packets/cells in a switch.

BACKGROUND

The desire to integrate data, voice, image, video and other traffic over high speed digital trunks has led to the requirement for faster networks including the capability to route more information faster from one node to another node. A switch performs this routing of information. Generally, the switch consists of three logical elements: ports, a switch fabric and a scheduler.

Routing and buffering functions are two major functions performed by a switch fabric. New packets arriving at an ingress are transferred by the scheduler across the switch fabric to an egress. The ingress refers to a side of the switch which receives arriving packets (or incoming traffic). The egress refers to a side of the switch which sends the packets out from the switch.

Most of the switches today are implemented using a centralized crossbar approach. FIG. 1 is an exemplary illustration of a centralized crossbar switch. The packets arrive at the centralized crossbar switch 100 at multiple ingress ports 105 on the ingress 102. They are transferred across the switch fabric 110 to multiple egress ports 115 on the egress 104 and then sent out to an output link (not shown). The centralized crossbar switch 100 can transfer packets between multiple ingress port-to-egress port connections simultaneously.

A centralized scheduler controls the transfer of the packets from the ingress ports 105 to the egress ports 115. Every packet that arrives at the ingress ports 105 has to be registered in the centralized scheduler. Each packet then waits for a decision by the centralized scheduler directing it to be transferred through the switch fabric 110. With fixed size packets, all the transmissions through the switch fabric 110 are synchronized.

Each packet belongs to a flow, which carries data belonging to an application. A flow may have multiple packets. There may be multiple flows arriving at the ingress ports 105 at the same time. Since the packets in these multiple flows may be transferred to the same egress port, each of these packets waits for its turn in ingress buffers (not shown) in the ingress 102.

The centralized scheduler examines the packets in the ingress buffers and chooses a set of conflict-free connections among the appropriate ingress ports 105 and egress ports 115 based upon the configuration of the switch fabric 110. One of the egress ports 115 may receive packets from one or more ingress ports 105. However, at any one time, the centralized scheduler ensures that each ingress port is connected to at most one egress port, and that each egress port is connected to at most one ingress port.

Each packet transferred across the switch fabric 110 by the centralized scheduler waits in egress buffers (not shown) in the egress 104 to be selected by the centralized scheduler for transmission out of the switch. The centralized scheduler places the selected packets in the appropriate egress ports 115 to have the packets transmitted out to an output link.

Each packet belongs to a flow. There may be multiple flows arriving at the ingress at the same time, and the centralized scheduler has to select a packet from one of these multiple flows. This may be time consuming since the number of incoming packets can be very large. For example, when there are 256 K flows, potentially there can be 256 K packets (one from each flow) from which to select. The centralized scheduler examines all of the incoming packets and then performs multiple comparisons in order to select a packet to send across the switch fabric 110. The packet is selected based on several factors, such as, for example, priority level, arrival time, etc. The large number of packets could make it difficult to perform all the comparisons and to select the packet to send across the switch fabric 110 in a short time. As such, the selection process may take multiple packet times (i.e., the time it takes for the switch to process one packet). That is, it takes more time for the switch to select a packet to send across the switch fabric than it takes for the switch to move the packet to an output link. This packet selection process may be inefficient because it slows the performance of the switch.

SUMMARY OF THE INVENTION

A method and apparatus for sorting packets is disclosed. In one embodiment, a method for sorting comprises grouping flows according to a first flow rate and a second flow rate. Each flow comprises multiple packets. The flows in the first flow rate may be sorted according to an arrival time of a first packet in each flow. These flows are placed in a first FIFO (first-in-first-out) queue with a flow having an earliest first packet arrival time located at a head of the first FIFO queue. The flows in the second flow rate may be sorted according to an arrival time of a first packet in each flow. These flows are placed in a second FIFO queue with a flow having an earliest first packet arrival time located at a head of the second FIFO queue. A comparison is performed to select a packet from between the first packet of the flow at the head of the first FIFO queue with the first packet of the flow at the head of the second FIFO queue.

Other objects, features and advantages of the present invention will be apparent from the accompanying drawings and from the detailed description which follows.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION

Figure 1:
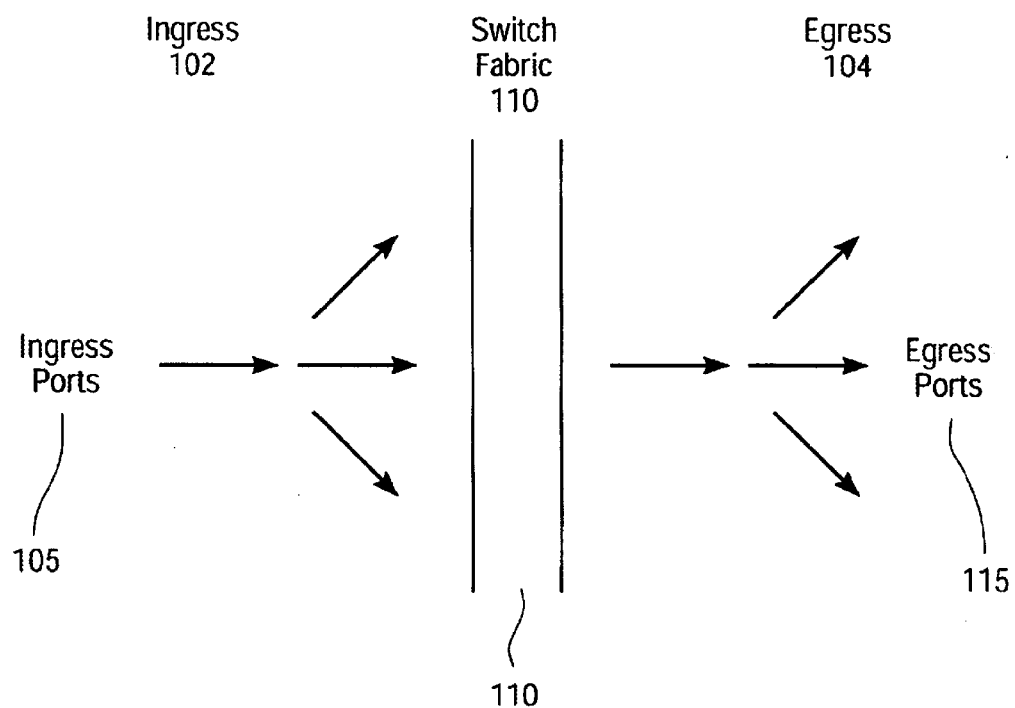
FIG. 1 is an exemplary diagram of a centralized crossbar switch.

A method and apparatus for sorting incoming packets in a switch is disclosed. In one embodiment, each packet belongs to a distinct flow. At any one time, a packet is to be selected from among the packets. The sorting technique described herein improves the selection process to select a packet to send across the switch fabric. Although the following discussion refers to packets, the discussion is also applicable to cells. The sorting technique is applicable to fixed or variable sized packets.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of processes leading to a desired result. The processes are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to system for performing the operations herein. This system may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other system. Various general-purpose systems may be used with programs in accordance with the teachings herein, or it may prove convenient to construct more specialized system to perform the required method processes. The required structure for a variety of these systems will appear from the description below. In addition, the present invention is not described with reference to any particular programming language. It will be appreciated that a variety of programming languages may be used to implement the teachings of the invention as described herein.

Overview

A method and apparatus for sorting packets in a switch is disclosed. For example, a packet may be selected when it has an earliest arrival time, and when it is associated with a highest priority level of all the packets. In one embodiment, the sorting technique improves the packet selection time of selecting a flow with a first packet having an earliest deadline time. The deadline time may be an arrival time, but more generally the deadline time may be calculated from a packet contract or contract rate, an arrival time of the packet, and a departure time of a previous packet from the same flow.

Figure 2A:
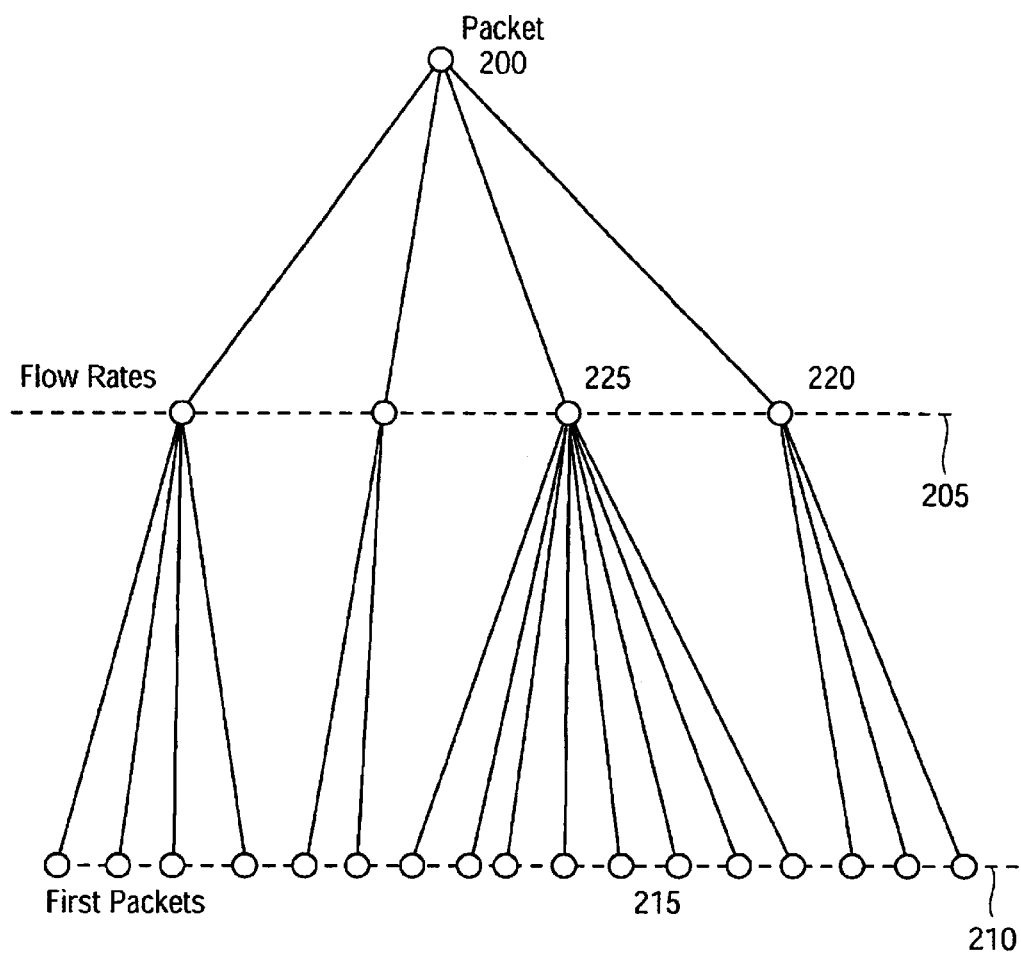
FIG. 2A is an exemplary hierarchical tree structure.

In one embodiment, a hierarchical tree structure is used to identify the packet to be selected from all of the incoming packets. FIG. 2A is an exemplary hierarchical tree structure. In this hierarchical tree structure, each of the nodes at the leaf level 210 is associated with a node at the intermediate level 205. A node at the intermediate level 205 may be associated with multiple nodes at the leaf level 210, but a node at the leaf level 210 can only belong to one node at the intermediate level 205.

The sorting technique uses the hierarchical tree structure with the flows and the first packet in the each flow to improve the sorting process. In one embodiment, each of the nodes at the leaf level 210 represents a first packet in each flow. The first packet in each flow is associated with an arrival time of that packet. Each flow is associated with a transmission rate requirement that has been reserved for that flow. The transmission rate is the bandwidth at which the user wants to have the flow transmitted. For example, depending on the applications being employed, one flow may require a transmission rate of 1 Mb/sec, another flow may require a transmission rate of 5 Mb/sec. or 10 Mb/sec., etc. In addition, there may be one or more flows having a similar transmission rate. The transmission rate is also referred to as flow rate. In one embodiment, the flows that have similar transmission rate are grouped together. Referring back to FIG. 2A, each of the nodes at the intermediate level 205 represents an individual transmission rate.

Thus, the packets at the leaf level 210 are grouped by the flow rates at the intermediate level 205. Therefore, instead of having to sort all the incoming packets at the leaf level 210, the incoming packets are first grouped by their required flow rates and sorted at the intermediate level 205. The hierarchical structure simplifies the packet selection process since the switch only needs to select a packet from the number of flow rates. Since the number of flow rates at the level 205 can be a lot smaller than the number of packets at the leaf level 210, the sorting and selection process should be faster.

In one embodiment, there are a fixed distinct number of flow rates such as, for example, 32. Using the above example, it should be faster to select a packet from the 32 flow rates than from the 256 K packets. Furthermore, since the number of flow rates is fixed, regardless of the number of packets, the selection time for the packet is the same. The technique described herein allows the packet (e.g., packet with an earliest deadline time) at the node 200 to be quickly determined.

Figure 2B:
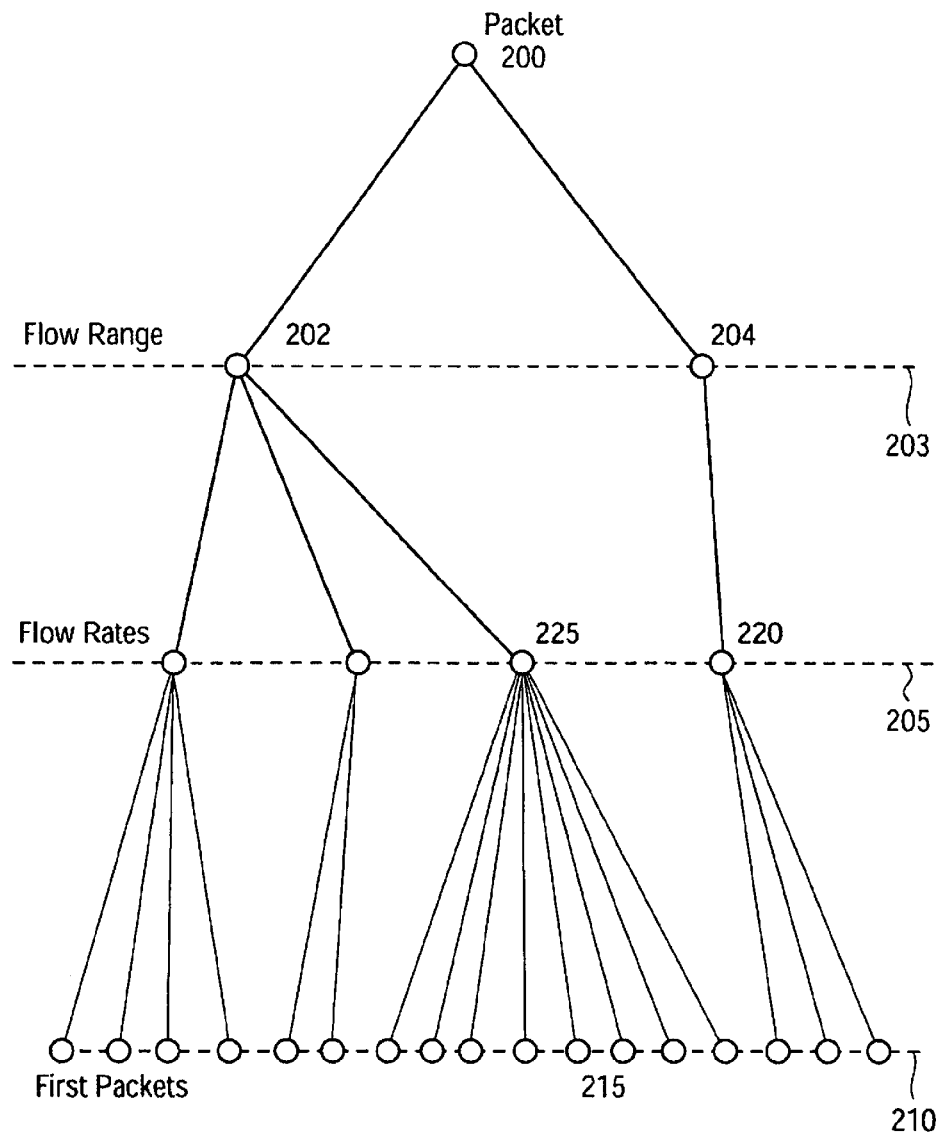
FIG. 2B is an exemplary hierarchical tree structure illustrating ranges of flow rates.

FIG. 2B is an exemplary hierarchical tree structure illustrating ranges of flow rates. In one embodiment, each of the nodes at the level 203 may represent a range of flow rates. For example, node 202 may represent a range of flow rate which includes 1 Mbps, 5 Mbps and 10 Mbps. Node 204 may represent another range of flow rate which includes 15 Mbps and 20 Mbps, etc. Although the tree structure illustrated in FIG. 2B has four levels, one skilled in the art would recognize that the teachings herein may also be practiced with multiple levels supporting multiple flows and flow rates to reduce the sorting requirement.

Figure 3:
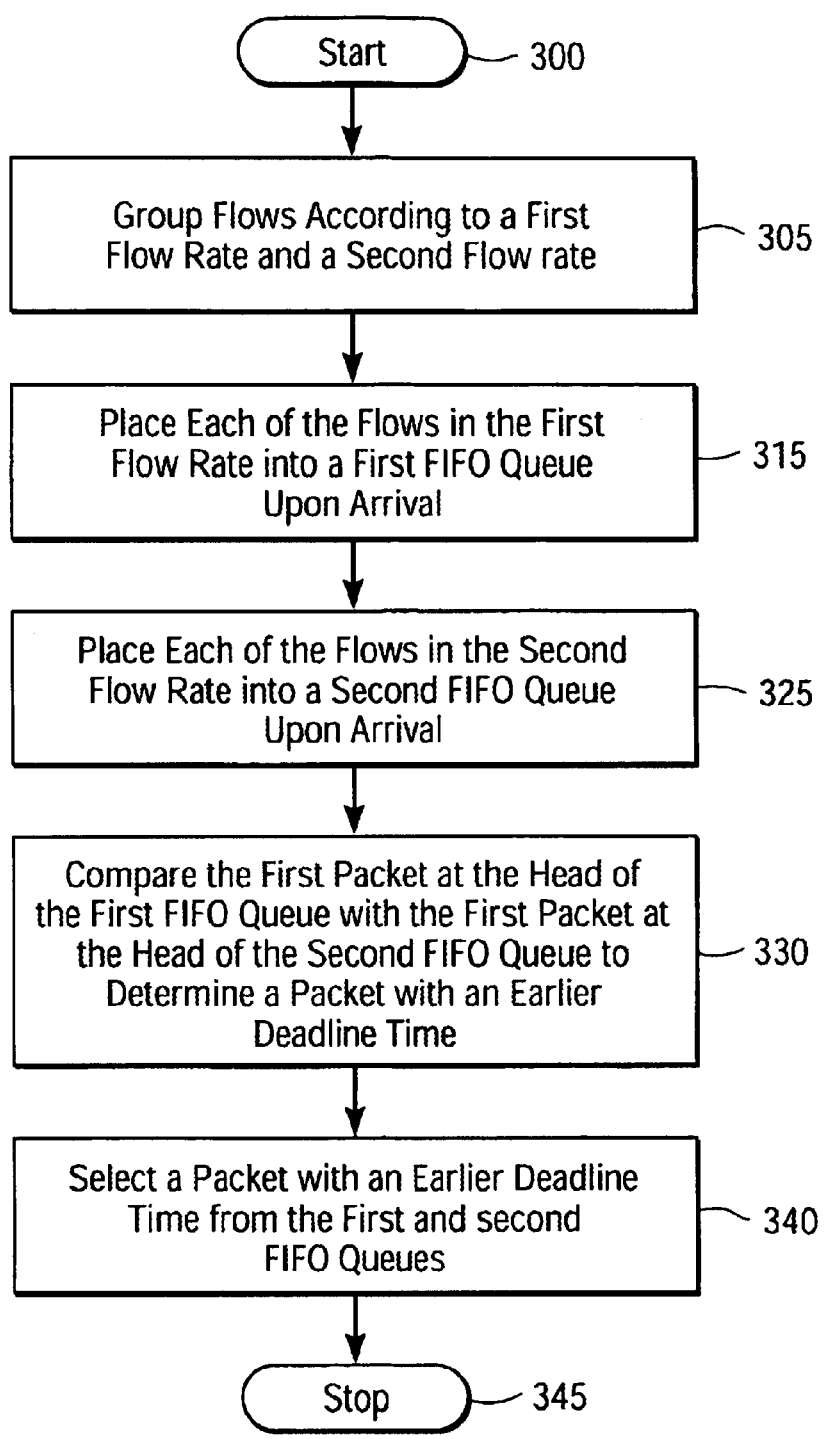
FIG. 3 is a flow diagram of one embodiment of a process for sorting packets.

FIG. 3 is a flow diagram of one embodiment of a process for sorting packets. The process is performed with processing logic that may comprise hardware (e.g., circuitry, dedicated logic, etc.), software (such as is run on a general purpose computer system or a dedicated machine), or a combination of both. Referring to FIG. 3, the process is applied using two flow rates. One skilled in the art would recognize that multiple flow rates may also be used. The process starts at block 300. At block 305, the flows are grouped together according to the flow rates such as, for example, 1 Mbps and 5 Mbps. As discussed herein, the flow rate is the bandwidth at which the user contracts to have the flow transmitted. Flow rate information may be encapsulated in the flow such that the ingress is able to identify and process the flow according to the flow rate. At block 315, each of the flows grouped under the first flow rate is placed into a first FIFO (first-in-first-out) queue upon its arrival time such that the flow having the earliest first packet arrival time is placed at the head of that FIFO queue. At block 325, each of the flows grouped under the second flow rate is placed into a second FIFO (first-in-first-out) queue upon its arrival time such that the flow having the earliest first packet arrival time is placed at the head of that FIFO queue. By placing each of these flows directly into a the appropriate FIFO queue upon arrival, a sorted list is automatically created for each flow rate based on an arrival time order without having to perform a sort operation.

Each of the first packets of the flow at the head of each of the two FIFO queues should have an earliest arrival time of all the packets in the respective FIFO queue. By comparing these two packets, a packet with an earliest deadline time time can be easily determined, as shown in block 330. This packet is then selected by the ingress or egress scheduler, as shown in block 340. The process ends at block 345.

Figure 4:
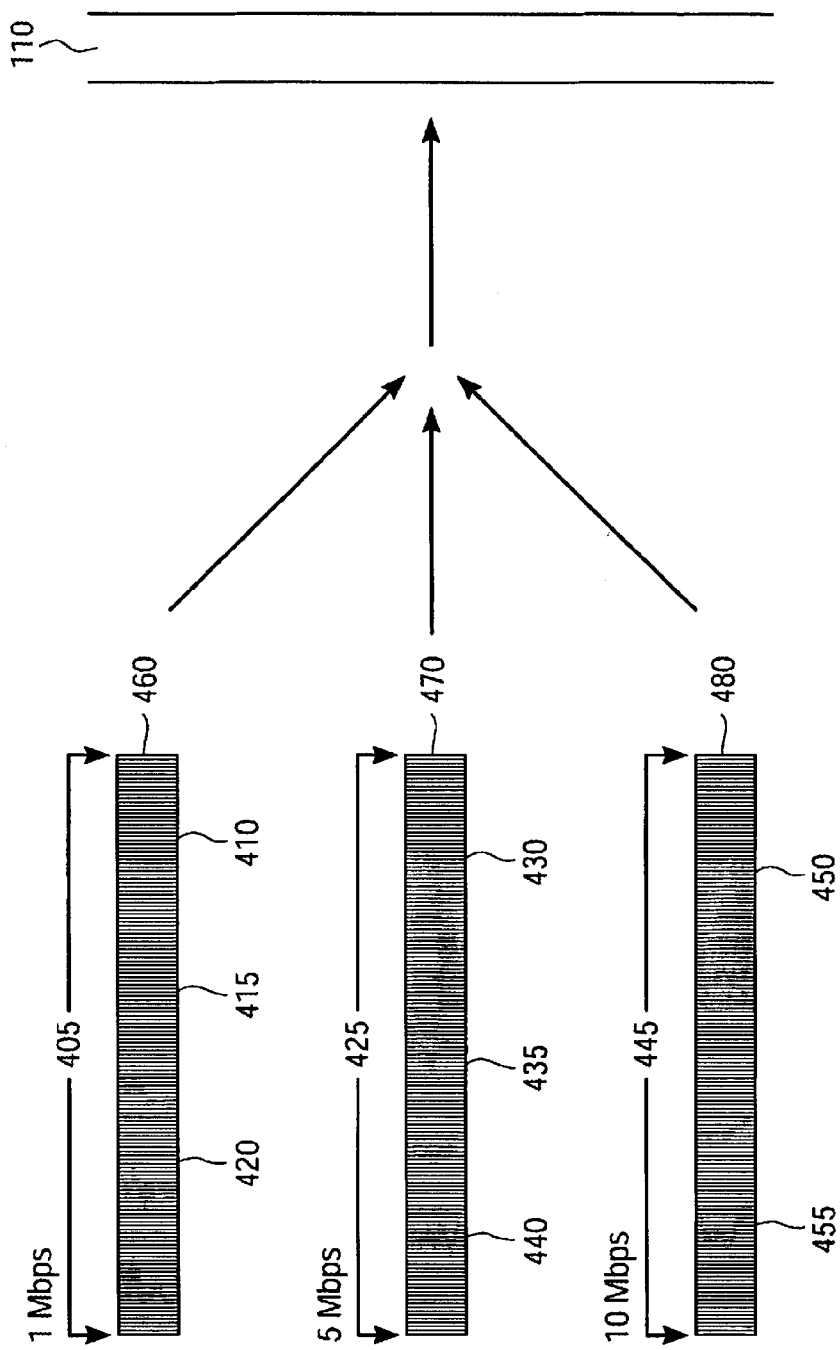
FIG. 4 is an exemplary diagram of FIFO queues in an ingress.

FIG. 4 is an exemplary diagram of FIFO queues in an ingress or egress. Block 405 represents a first FIFO queue associated with the flow rate of 1 Mbps. Block 405 consists of three flows 410, 415 and 420. Block 425 represents a second FIFO queue associated with the flow rate of 5 Mbps. Block 425 consists of three flows 430, 435 and 440. Block 445 represents a third FIFO queue associated with the flow rate of 10 Mbps. Block 445 consists of two flows 450 and 455. One skilled in the art would recognize that there may be more flows and FIFO queues. Using the technique described here, the scheduler needs only to compare the three packets 460, 470 and 480 at the head of each of the three FIFO queues. This is faster than having to perform comparisons on the eight packets at the head of the eight flows.

The sorting process described with the hierarchical structure above to select the winning packet is based on the following equation:

$$F = S + (1/\text{flow rate})$$

where (1/flow rate) represents the time it takes to transmit one packet having that flow rate and F represents the finishing time of the first packet in the flow when that packet is transmitted, and S represents the starting time when the packet is transmitted. Each FIFO queue may have multiple flows and each flow may have multiple packets. In one embodiment, since all the flows in the same FIFO queue have the same (or similar) flow rate, the (1/flow rate) value is the same for all of the packets in these flows. As such, when the first packets in all of these flows are sorted based on S, the order among these first packets is the same as the order of their corresponding flows.

The starting time of the packet is the same as the time when the packet arrives. Thus, the starting time of the flow at the head of the FIFO queue is earlier than the starting time of flow behind it in the FIFO queue, and so on. When a new flow is inserted into the FIFO queue, it is inserted at the back of the FIFO queue. This is because the starting time of this new flow is later than the starting time of the flow ahead of it in the FIFO queue. Since the flows are ordered based on the starting time and since the flow rate is the same, the finishing time of each flow will also be in the same order.

Thus, by just placing the flows into the FIFO queues according to the flow rate, the packets are automatically sorted. By comparing the arrival time of the packets at the head of each of the FIFO queues, the sorting process can be quickly performed. This is much faster than having to sort all the first packets of each flow.

The technique described herein may be stored in the memory of a computer system as a set of instructions (i.e., software). The set of instructions may reside, completely or at least partially, within the main memory and/or within the processor to be executed. In addition, the set of instructions to perform the methods described above could alternatively be stored on other forms of machine-readable media. For the purposes of this specification, the term "machine-readable media" shall be taken to include any media which is capable of storing or embodying a sequence of instructions for execution by the machine and that cause the machine to perform any one of the methodologies of the present invention. The term "machine readable media" shall accordingly be taken to include, but not limited to, optical and magnetic disks.

Alternatively, the logic to perform the methods as discussed above, could be implemented in additional computer and/or machine readable media, such as, for example, discrete hardware components as large-scale integrated circuits (LSI's), field programmable gate array (FPGA's), application-specific integrated circuits (ASIC's), firmware such as electrically erasable programmable read-only memory (EEPROM's), and electrical, optical, acoustical and other forms of propagated signals (e.g., carrier waves, infrared signals, digital signals, etc.), etc.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A method, comprising:

identifying a plurality of flows according to a first flow rate and a second flow rate, each flow comprising a plurality of packets;

sorting the flows associated with the first flow rate into a first FIFO (first-in-first-out) queue according to an arrival time order to generate a first sorted list, the first sorted list having a first packet with an earliest packet arrival time located at a head of the first FIFO queue;

sorting the flows associated with the second flow rate into a second FIFO queue according to the arrival time order to generate a second sorted list, the second sorted list having a first packet with an earliest first packet arrival time located at a head of the second FIFO queue; and comparing the first packet of the first sorted list at the head of the first FIFO queue with the first packet of the second sorted list at the head of the second FIFO queue to determine which packet has an earlier deadline time.

2. The method of claim 1 wherein each of the flows associated with the first flow rate has a bandwidth in a first range, and wherein each of the flows associated with the second flow rate has a bandwidth in a second range.

3. The method of claim 1, wherein the deadline time is calculated based on a packet contract.

4. The method of claim 3, wherein the deadline time is further calculated based on an arrival time of the packet.

5. The method of claim 4, wherein the deadline time is further calculated based on a packet departure time of a previous packet in a same flow.

6. A computer readable medium having stored thereon sequences of instructions which are executable by a system, and which, when executed by the system, cause the system to:

identify a plurality of flows according to a first flow rate and a second flow rate, each flow comprising a plurality of packets;

sorting the flows associated with the first flow rate into a first FIFO (first-in-first-out) queue according to an arrival time order to generate a first sported list, the first sorted list having a first packet with an earliest packet arrival time located at a head of the first FIFO queue;

sorting the flows associated with the second flow rate into a second FIFO queue according to the arrival time order to generate a second sorted list, the second sorted list having a packet with an earliest packet arrival time located at a head of the second FIFO queue; and compare the first packet of the first sorted list at the head of the first FIFO queue with the first packet of the second sorted list at the head of the second FIFO queue to determine which packet has an earlier deadline time.

7. The computer readable medium of claim 6, wherein each of the flows associated with the first flow rate has a bandwidth in a first range, and wherein each of the flows associated with the second flow rate has a bandwidth in a second range.

8. The computer readable medium of claim 7, wherein the deadline time is calculated based on a packet contract.

9. The computer readable medium of claim 8, wherein the deadline time is further calculated based on an arrival time of a packet.

10. The computer readable medium of claim 9, wherein the deadline time is further calculated based on a packet departure time of a previous packet in a same flow.

11. A computer system, comprising:

a bus;

a data storage device coupled to said bus; and a processor coupled to said data storage device, said processor operable to receive instructions which, when executed by the processor, cause the processor to perform a method comprising:

identifying a plurality of flows according to a first flow rate and a second flow rate, each flow comprising a plurality of packets;

sorting the flows associated with the first flow rate into a first FIFO (first-in-first-out) queue according to an arrival time order to generate a first sorted list, the first sorted list having a first packet with an earliest packet arrival time located at a head of the first FIFO queue;

sorting the flows associated with the second flow rate into a second FIFO queue according to the arrival time order to generate a second sorted list, the second sorted list having a first packet with an earliest packet arrival time located at a head of the second FIFO queue; and comparing the first packet of the first sorted list at the head of the first FIFO queue with the first packet of the first sorted list at the head of the second FIFO queue to determine which packet has an earlier deadline time.

12. The computer system of claim 11, wherein each of the flows associated with the first flow rate has a bandwidth in a first range, and wherein each of the flows associated with the second flow rate has a bandwidth in a second range.

13. The computer system of claim 11, wherein the deadline time is calculated based on a packet contract.

14. The computer system of claim 13, wherein the deadline time is further calculated based on an arrival time of a packet.

15. The computer system of claim 14, wherein the deadline time is further calculated based on a packet departure time of a previous packet in a same flow.

16. A method of sorting packets in a switch, comprising:

grouping a plurality of flows according to a first bandwidth range and a second bandwidth range, each flow comprising a plurality of cells, a first cell in each flow associated with an arrival time;

sorting the flows in the first bandwidth range according to an arrival time order to create a first sorted list;

sorting the flows in the second bandwidth range according to the arrival time order to create a second sorted list; and selecting a cell from the first sorted list and the second sorted list based on a deadline time.

17. The method of claim 16, wherein sorting the flows in the first bandwidth range comprises placing each of the flows in the first bandwidth range into the first sorted list upon arrival.

18. The method of claim 16, wherein sorting the flows in the second bandwidth range comprises placing each of the flows in the second bandwidth range into the second sorted list upon arrival.

19. The method of claim 16, wherein the first sorted list and the second sorted list are in a first-in-first-out (FIFO) order.

20. The method of claim 16, wherein the deadline time is calculated based on a contract rate.

21. The method of claim 20, wherein the deadline time is further calculated based on a packet arrival time.

22. The method of claim 21, wherein the deadline time is further calculated based on a packet departure time of a previous packet in a same flow.

23. A method, comprising:

identifying a plurality of flows according to a first flow rate and a second flow rate, each of the flows identified according to the first flow rate has a bandwidth in a first range, each of the flows identified according to the second flow rate has a bandwidth in a second range;

sorting the flows associated with the first flow rate into a first FIFO (first-in-first-out) queue according to an arrival time order to generate a first sorted list, the first sorted list having a first packet with an earliest packet arrival time located at a head of the first FIFO queue;

sorting the flows associated with the second flow rate into a second FIFO queue according to the arrival time order to generate a second sorted list, the second sorted list having a first packet with an earliest packet arrival time located at a head of the second FIFO queue;

comparing the first packet of the first sorted list at the head of the first FIFO queue with the first packet of the second sorted list at the head of the second FIFO queue to select a packet with an earlier deadline time; and sending the packet with the earlier deadline time to a switch fabric.

24. The method of claim 23, wherein the deadline time is calculated based on a packet contract.

25. The method of claim 23, wherein the deadline time is further calculated based on an arrival time of the packet.

26. The method of claim 23, wherein the deadline time is further calculated based on a packet departure time of a previous packet in a same flow.

27. A machine-readable medium having executable code to cause a machine to perform a method, the method comprising:

grouping a plurality of flows according to a first bandwidth range and a second bandwidth range, each flow comprising a plurality of cells, a first cell in each flow associated with an arrival time;

sorting the flows in the first bandwidth range according to an arrival time order to create a first sorted list;

sorting the flows in the second bandwidth range according to the arrival time order to create a second sorted list; and selecting a cell from the first sorted list and the second sorted list based on a deadline time.

28. The machine-readable medium of claim 27, wherein sorting the flows in the first bandwidth range comprises placing each of the flows in the first bandwidth range into the first sorted list upon arrival.

29. The machine-readable medium of claim 27, wherein sorting the flows in the second bandwidth range comprises placing each of the flows in the second bandwidth range into the second sorted list upon arrival.

30. The machine-readable medium of claim 27, wherein the first sorted list and the second sorted list are in a first-in-first-out (FIFO) order.

31. The machine-readable medium of claim 27, wherein the deadline time is calculated based on a contract rate.

32. The machine-readable medium of claim 31, wherein the deadline time is further calculated based on a packet arrival time.

33. The machine-readable medium of claim 32, wherein the deadline time is further calculated based on a packet departure time of a previous packet in a same flow.

34. A computer system, comprising:

a bus;

a data storage device coupled to said bus; and a processor coupled to said data storage device, said processor operable to receive instructions which, when executed by the processor, cause the processor to perform a method comprising:

grouping a plurality of flows according to a first bandwidth range and a second bandwidth range, each flow comprising a plurality of cells, a first cell in each flow associated with an arrival time;

sorting the flows in the first bandwidth range according to an arrival time order to create a first sorted list;

sorting the flows in the second bandwidth range according to the arrival time order to create a second sorted list; and selecting a cell from the first sorted list and the second sorted list based on a deadline time.

35. The computer system of claim 34, wherein sorting the flows in the first bandwidth range comprises placing each of the flows in the first bandwidth range into the first sorted list upon arrival.

36. The computer system of claim 34, wherein sorting the flows in the second bandwidth range comprises placing each of the flows in the second bandwidth range into the second sorted list upon arrival.

37. The computer system of claim 34, wherein the first sorted list and the second sorted list are in a first-in-first-out (FIFO) order.

38. The computer system of claim 34, wherein the deadline time is calculated based on a contract rate.

39. The computer system of claim 38, wherein the deadline time is further calculated based on a packet arrival time.

40. The computer system of claim 39, wherein the deadline time is further calculated based on a packet departure time of a previous packet in a same flow.

* * * * *

UNITED STATES PATENT AND TRADEMARK OFFICE
CERTIFICATE OF CORRECTION

PATENT NO. : 6,714,554 B1
DATED : March 30, 2004
INVENTOR(S) : Jin et al.

It is certified that error appears in the above-identified patent and that said Letters Patent is hereby corrected as shown below:

Column 5,
Line 24, delete "a".

Signed and Sealed this

Thirteenth Day of July, 2004

JON W. DUDAS
*Acting Director of the United States Patent and Trademark Office*